(12) United States Patent
MacLeod

(10) Patent No.: US 10,162,829 B2
(45) Date of Patent: Dec. 25, 2018

(54) ADAPTIVE PARALLEL DATA PROCESSING

(71) Applicant: Adobe Systems Incorporated, San Jose, CA (US)

(72) Inventor: Peter S. MacLeod, Bainbridge Island, WA (US)

(73) Assignee: Adobe Systems Incorporated, San Jose, CA (US)

(\*) Notice: Subject to any disclaimer, the term of this patent is extended or adjusted under 35 U.S.C. 154(b) by 329 days.

(21) Appl. No.: 14/017,107

(22) Filed: Sep. 3, 2013

(65) Prior Publication Data

US 2015/0067003 A1 Mar. 5, 2015

(51) Int. Cl.
*G06F 3/12* (2006.01)
*G06F 17/30* (2006.01)

(52) U.S. Cl.
CPC ........ *G06F 17/30115* (2013.01); *G06F 3/124* (2013.01); *G06F 17/30247* (2013.01); *G06F 17/30253* (2013.01)

(58) Field of Classification Search
CPC ......... G06F 17/30115; G06F 17/30247; G06F 17/30253
See application file for complete search history.

(56) References Cited

U.S. PATENT DOCUMENTS

| | | | |
|---|---|---|---|
| 6,817,791 B2 * | 11/2004 | Klassen | 400/62 |
| 8,510,538 B1 * | 8/2013 | Malewicz | G06F 7/38 712/220 |
| 8,832,176 B1 * | 9/2014 | Hundt | G06F 9/5027 709/201 |
| 8,903,841 B2 * | 12/2014 | Friedman et al. | 707/764 |
| 2003/0177240 A1 * | 9/2003 | Gulko | G06F 8/451 709/226 |
| 2006/0171005 A1 * | 8/2006 | Eun | 358/540 |
| 2009/0083624 A1 * | 3/2009 | Hamilton et al. | 715/273 |
| 2009/0116746 A1 * | 5/2009 | Neogi et al. | 382/190 |
| 2009/0153892 A1 * | 6/2009 | Torii | 358/1.13 |
| 2009/0161163 A1 * | 6/2009 | Klassen et al. | 358/1.18 |
| 2011/0299112 A1 * | 12/2011 | Ota | 358/1.15 |
| 2012/0013940 A1 * | 1/2012 | Miyazaki | 358/1.15 |
| 2012/0210323 A1 * | 8/2012 | Hosouchi | G06F 9/5038 718/102 |
| 2012/0303791 A1 * | 11/2012 | Calder | H04L 67/1002 709/224 |
| 2013/0258375 A1 * | 10/2013 | Morgana et al. | 358/1.13 |
| 2014/0279322 A1 * | 9/2014 | Keshkamat et al. | 705/34 |

\* cited by examiner

*Primary Examiner* — John M Macilwinen

(74) *Attorney, Agent, or Firm* — Wolfe-SBMC

(57) ABSTRACT

Adaptive parallel data processing techniques are described. In one or more embodiments, a request is received to process a data file. The data file is split into multiple portions and sent to multiple nodes, where each node is configured to process a respective portion of the data file. Responsive to an amount of processing of the data file being completed, at least one of the multiple portions of the data file is dynamically split into multiple sub-portions. The sub-portions are submitted to one or more of the multiple nodes for processing of the sub-portions.

20 Claims, 6 Drawing Sheets

ADAPTIVE PARALLEL DATA PROCESSING

BACKGROUND

Traditional techniques that were employed to process electronic data may become less efficient as the size or complexity of the data increases. For example, a large document having hundreds or even thousands of pages, may take minutes or even hours to convert from an image format to a searchable and/or editable format. Consequently, converting these large and/or complex documents to a searchable and/or editable format may frustrate users by the sheer length of time used for processing the documents. Thus, traditional techniques that were used to process large and/or complex documents may limit the usefulness of the conversion of the documents to a user.

SUMMARY

Adaptive parallel data processing techniques are described. In one or more embodiments, a request is received to process a data file and the data file is split into multiple portions. The multiple portions are sent to multiple nodes, where each node processes a respective portion of the data file. Responsive to an amount of processing of the data file being completed, at least one of the multiple portions of the data file that remains is dynamically split into multiple sub-portions. The sub-portions are submitted to one or more of the multiple nodes for processing of the sub-portions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
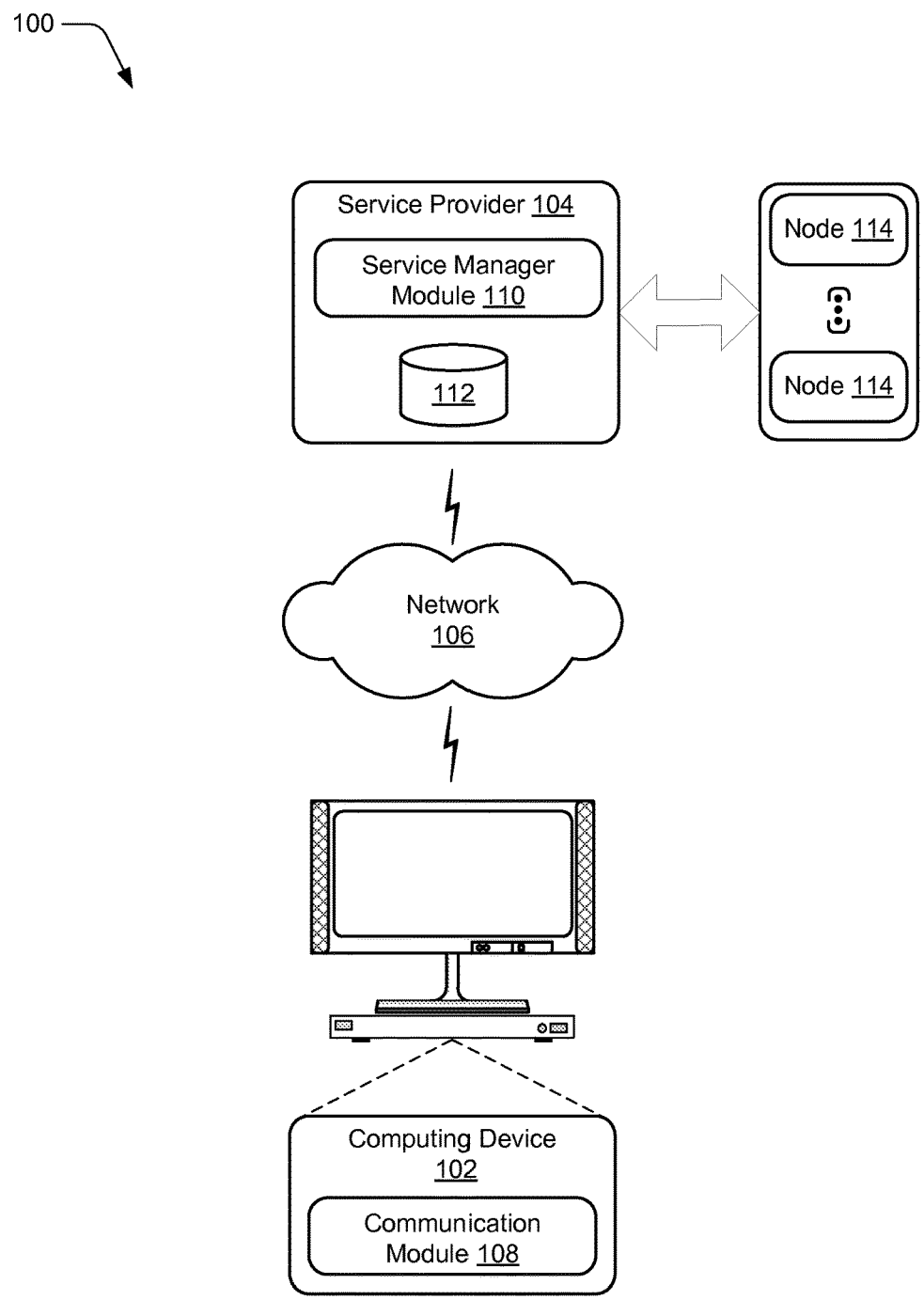
FIG. 1 is an illustration of an environment in an example implementation that is operable to employ adaptive parallel data processing techniques.

Conventional techniques that were used for processing data may become less efficient with increased size and complexity of the data. Therefore, these conventional techniques may result in user frustration regarding an amount of time to process the data. Techniques involving adaptive parallel data processing are described. In the following discussion, a variety of different implementations are described that involve reducing the amount of time to process data.

Reducing the amount of time to process data may include splitting the data into smaller portions that can be individually processed in parallel. If one particular portion takes too long to complete, then that portion can be further split into even smaller portions that can be individually processed in parallel. The smaller portions include less data, and therefore may be processed more quickly than the larger portion, thereby saving time for the user.

In one example, the data may be split into portions and submitted to a pool of nodes. Each node can process one or more portions of the data. The different portions may have different individual processing times, with one or more of the portions having a substantially longer processing time than another portion. Consequently, total processing time of the data is limited to the portion with the maximum individual processing time.

To potentially reduce the total processing time of the data, the portion with the relatively longer processing time can be further split into sub-portions, and those sub-portions can be submitted to the pool of nodes. If those sub-portions are completed before the larger portion, then the sub-portions can be used to complete the processing of the data, thereby reducing the total processing time of the data that would otherwise be limited by the larger portion of the data.

For example, a document may be requested to be converted from a "pdf" format into a .doc format. Traditional techniques to convert a relatively small size document may take seconds to complete. However, relatively large and/or complex documents, such as documents with hundreds or thousands of pages, may take minutes or hours to complete. In one implementation, the document is split into smaller units that each include several pages. Each unit is sent to a separate processing instance on the cloud for conversion. The total amount of time to complete conversion of the entire document can be limited to an amount of time to complete conversion of a single unit. The amount of time to process a unit may vary based on the unit containing images or other content that takes relatively longer to convert.

Monitoring progress of the conversion process may provide an indication of how much of the document conversion is completed. If some percentage of units have completed, the remaining units may be split into smaller sub-units and resubmitted to the processing instances on the cloud for conversion. If these resubmitted sub-units complete before the previously submitted units complete, then the results of the resubmitted sub-units are used to complete the conversion process of the document. In this way, the total amount of time to complete the conversion process of the entire document may be reduced rather than being limited by the processing time of the remaining portions.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes a computing device 102 and a service provider 104 that are communicatively coupled via a network 106. The computing device 102 as well as computing devices that implement the service provider 104 may be configured in a variety of ways.

The computing devices, for example, may be configured as a desktop computer, a laptop computer, a mobile device (e.g., assuming a handheld configuration such as a tablet or mobile phone), and so forth. Thus, the computing devices may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers of the service provider 104 utilized by a business to perform operations "over the cloud" as further described in relation to FIG. 6, a tablet and a peripheral device, and so on.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be representative of multiple networks.

The computing device 102 is also illustrated as including a communication module 108. The communication module 108 is representative of functionality to communicate via the network 106, such as with one or more services of the service provider 104. As such, the communication module 108 may be configured in a variety of ways. For example, the communication module 108 may be configured as a browser that is configured to "surf the web." The communication module 108 may also be representative of network access functionality that may be incorporated as part of an application, e.g., to provide network-based functionality as part of the application, an operating system, and so on. Thus, functionality represented by the communication module 108 may be incorporated by the computing device 102 in a variety of different ways.

The service provider 104 is representative of functionality of the service provider 104 to provide one or more network-based services. The services are managed by a service manager module 110 to support a variety of different functionality. The services (e.g., web services), for instance, may be configured to support word processing, spreadsheets, graphics composition, graphics editing, sound editing, presentations, multimedia editing, three-dimensional scene rendering for video and/or film, video and/or motion graphics rendering, video transcoding, and so on. Thus, a variety of different types of content may be edited (e.g., created and/or modified) by the services, which may be maintained in storage 112 of the service provider 104.

Service manager module 110 is configured to manage processing of data and/or content requested or provided by the computing device 102. In some instances, a user may wish to use the network-based services to convert a document into a searchable and/or editable format. In one or more implementations, the service manager module 110 splits the content into multiple portions and provides the multiple portions to a pool of nodes, as described in more detail below.

Nodes 114 include and/or are representative of functionality operable to process each of the portions of the content. A node, therefore, can be comprised of one or more servers. A server can also comprise one or more nodes. Each node can represent a separate processing instance on the cloud for processing the content. The nodes 114 can process content in parallel with one another, as further described below.

Having described example operating environments in which the inventive principles can be employed, consider now a discussion of various embodiments.

Data Processing

Figure 2:
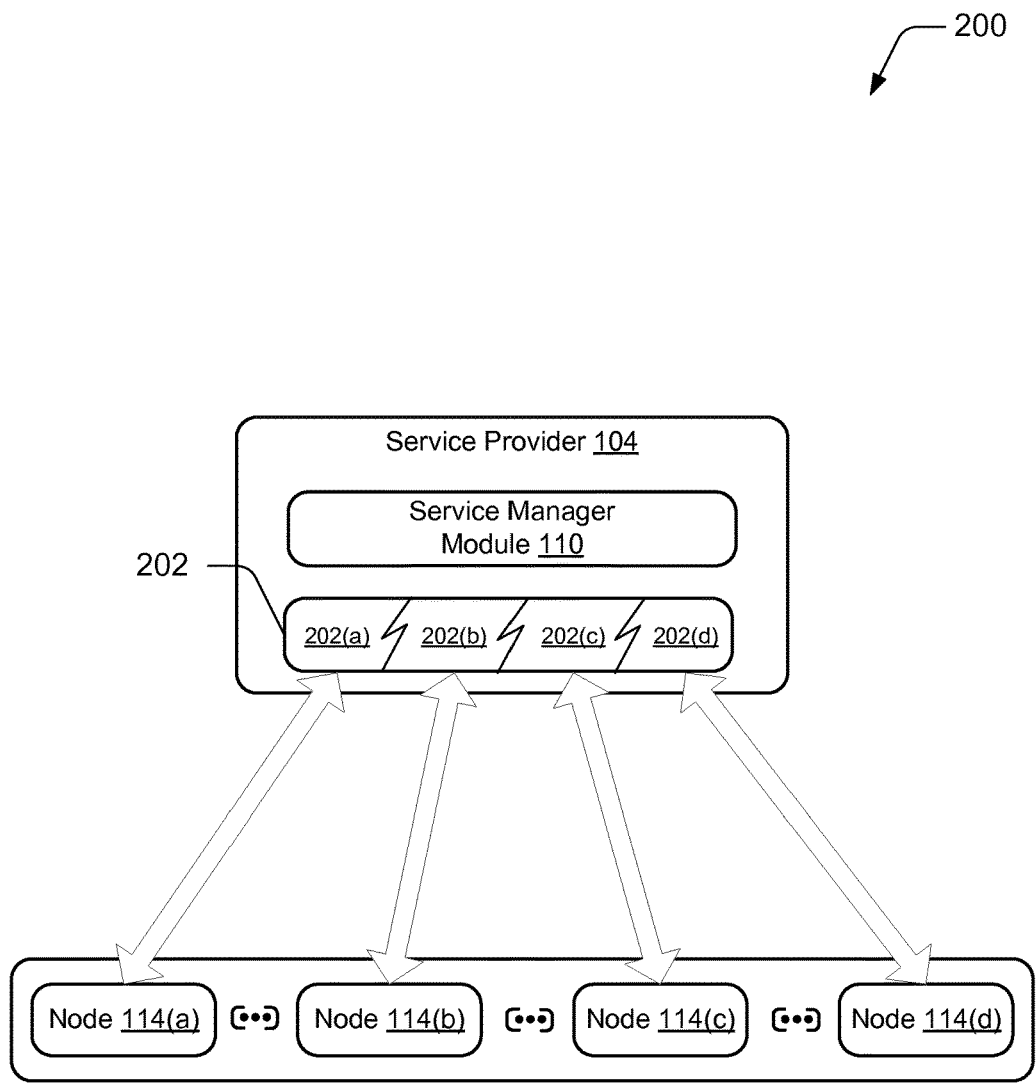
FIG. 2 is an illustration of a system in an example implementation showing the service provider of FIG. 1 in greater detail.

FIG. 2 is an illustration of a system 200 in an example implementation showing the service provider of FIG. 1 in greater detail. In one or more embodiments, service manager module 110 is configured to split content 202 into several portions (e.g., components, units, parts, pieces, and so on). Content 202 can be provided by a computing device that requests conversion of the content 202, or stored at a database accessible by the service manager module 110. In other embodiments, the content 202 can include a combination of content stored in a database and content received from the requesting computing device. Content 202 can include a data file, a document, media content, three-dimensional scene rendering for video and/or film, video and/or motion graphics rendering, video transcoding, and so on. In some implementations, the content 202 can be formatted in a non-editable format, a partially editable format, or an editable format. In addition, the content 202 can include searchable and/or non-searchable content. Also, the content 202 can be formatted to be accessed and/or rendered by a specific application or by multiple different applications. The content 202 can include any suitable format such as, for example, .pdf, .doc, .docx, .xls, .html, .gif, .jpeg, .xml, .txt, .xps, and so on. It should be recognized that this list of example formats is not an exclusive or exhaustive list of examples. Other formats are also contemplated.

In one or more embodiments, the service manager module 110 splits the content 202 into multiple portions. By way of example and not limitation, content 202 is shown as being split into portions 202(a)-(d). These portions can have heterogeneous processing times. For example, depending on size and/or complexity of content within the portions, one portion can be processed relatively more quickly than one or more other portions.

As shown in FIG. 2, each portion 202(a)-(d) can be sent to a separate node 114(a)-(d), respectively, for processing. If the individual processing times of the portions 202(a)-(d) are equal to one another, then the total processing time of the content 202 may be equal to the maximum processing time of any one of the portions 202(a)-(d). In some instances, however, the individual processing times of the various portions of the content are heterogeneous. In these cases, a single portion of the content might take a substantially longer time to process than other portions of the content, thereby increasing a total processing time of the content. This relatively longer processing time may be caused by the single portion containing images or other content that takes longer to process.

Figure 3:
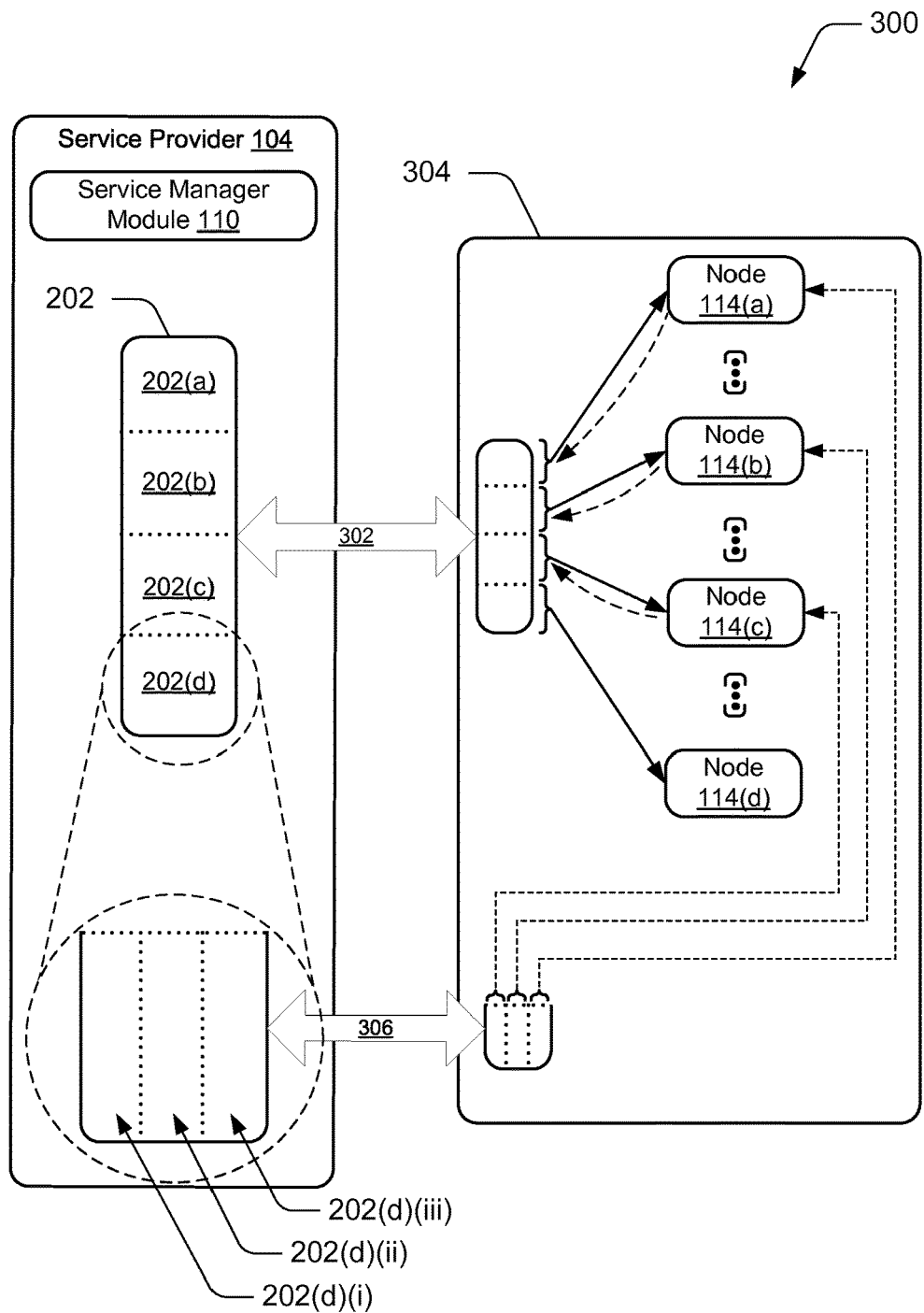
FIG. 3 is an illustration of a system in an example implementation operable to employ adaptive parallel data processing techniques.

Consider now FIG. 3, which is an illustration of a system 300 in an example implementation operable to employ adaptive parallel data processing techniques. In one or more embodiments, the service manager module 110 is configured to split the content 202 into several portions. For example, an electronic document can be split into multiple portions, where each portion contains one or more pages of the document. In one or more embodiments, the electronic document may have "n" pages, and can be split into "k"

portions with approximately "n/k" pages in each portion, thereby enabling the document to be processed on "k" nodes.

Continuing with the example described above in FIG. 2, content 202 is split into four portions 202(a)-(d). The content 202 may be split into more or less portions than in this example. However, for ease of explanation, four portions are shown in the example illustrated in FIG. 3. Portions 202(a)-(d) are submitted, via arrow 302, to the pool of nodes 304 for processing. In at least some embodiments, each portion can be sent to a separate node. In this example, portion 202(a) is sent to node 114(a), portion 202(b) is sent to node 114(b), portion 202(c) is sent to node 114(c), and portion 202(d) is sent to node 114(d). Each node 114(a)-(d) is configured to then process the respective portions 202(a)-(d) and return a response. Because each portion 202(a)-(d) contains different data, the individual processing times of each portion may differ from one another. As described above, a single portion may have a substantially longer processing time than one or more other portions.

To decrease the total processing time of the content 202, portions with relatively longer processing times may be further split into smaller sub-portions, and those sub-portions may be re-submitted to the pool of nodes 304. For example, nodes 114(a)-(c) in FIG. 3 each returned a response, as illustrated by the dashed arrows, corresponding to respective portions 202(a)-(c). However, no response has been returned by node 114(d) because node 114(d) is still processing portion 202(d). Service manager module 110 may split portion 202(d) into several sub-portions 202(d)(i)-(iii). These sub-portions 202(d)(i)-(iii) can then be submitted to the pool of nodes 304 via arrow 306 for processing of each sub-portion. Each sub-portion 202(d)(i)-(iii) is distributed to a separate node that is available to process the respective sub-portion. In an implementation, the available node may be a node that has completed processing of one of the portions 202(a)-(c) since that node is no longer processing a portion. In another implementation, the available node may be another node in the pool of nodes that is not currently processing another job. Because sub-portions 202(d)(i)-(iii) are relatively smaller than portion 202(d), individual processing times of the sub-portions 202(d)(i)-(iii) may be substantially shorter than the processing time of portion 202(d). Thus, the total processing time of content 202 may be reduced if the processing of the sub-portions 202(d)(i)-(iii) is completed prior to the processing of the larger portion 202(d).

If the sub-portions 202(d)(i)-(iii) complete prior to completion of the portion 202(d), then the service manager module 110 can use the results corresponding to the sub-portion to complete the processing of the content 202. Otherwise, if the portion 202(d) completes prior to the sub-portions 202(d)(i)-(iii), then the results of the portion 202(d) may be used to complete the total processing of the content 202.

In one or more embodiments, a threshold may be used to determine whether to further split a portion into sub-portions. For example, the service manager module 110 can monitor progress of a processing job based on a number of responses received from the nodes. Any suitable threshold may be used. For example, the number of responses received from the nodes can indicate a number of completed portions. The number of completed portions can be compared to a number of the portions that were submitted for processing. Using this comparison, the service manager module 110 can calculate a percentage or fraction of the total processing job that has completed. In one example, if results have been received from the nodes that amount to approximately 80% of the content 202 being completed, then the service manager module 110 may automatically split one or more remaining portions (in this example 20%) into sub-portions and resubmit the sub-portions to the nodes. Allowing the nodes to process these smaller sub-portions may decrease the maximum time to process a particular job that contains very heterogeneous per-portion processing times.

In at least one embodiment, one or more of the sub-portions may be further split into smaller micro-portions and these micro-portions can be resubmitted to the pool of nodes for processing. The service manager module 110 can then use the first result received from either the micro-portions or the corresponding sub-portion.

Having described various embodiments of example systems, consider now a discussion of various example procedures.

Example Procedures

The following discussion describes adaptive parallel data processing techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 200 and 300 of FIGS. 2 and 3, respectively.

Figure 4:
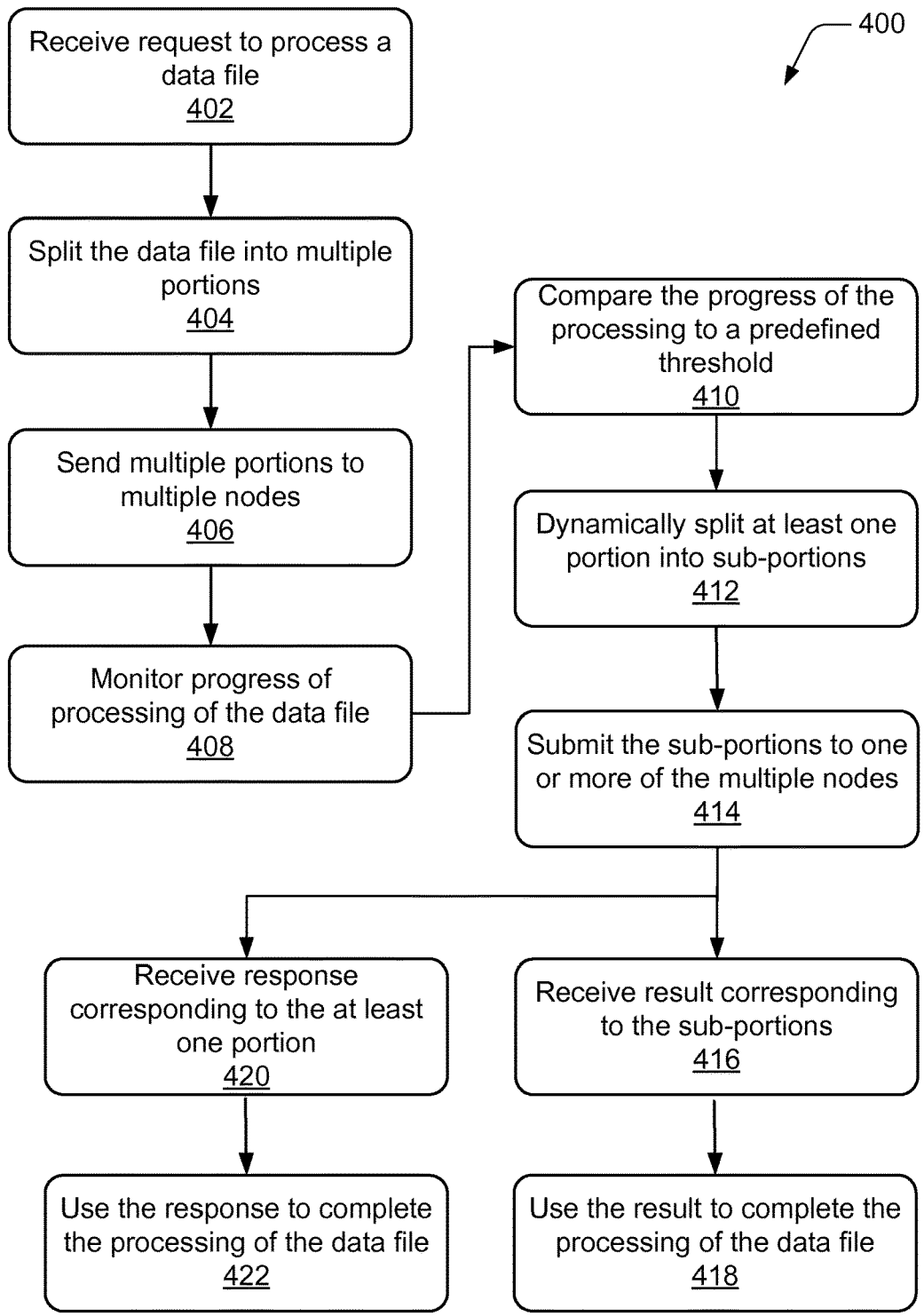
FIG. 4 is a flow diagram depicting a procedure in an example implementation in which adaptive parallel data processing techniques are employed.

FIG. 4 is a flow diagram depicting a procedure 400 in an example implementation in which adaptive parallel data processing techniques are employed. A request to process a data file is received (block 402). For example, the request may be received from a client device over a network. The request can include a request to convert the data file from a non-editable format to an editable format, such as from a "pdf" format to a .docx document. In at least one embodiment, the request can include a request to convert the data file to a searchable format. In addition, the request can include the data file to be processed, or provide a location in a database to enable the service manager module 110 to retrieve the data file.

The data file is split into multiple portions (block 404). This step can be performed in any suitable way. For instance, the service manager module 110 can split the data file into a number of portions or sections based on a number of nodes available to process each portion. In one or more embodiments, the data file can be split into a number of portions based on any number of criteria, such as size, content, or other criteria that may affect processing times. These portions can have comparatively heterogeneous processing times. Differences in processing times can be based on a type of content within each portion. For example, a particular portion can include image data, or any other data that takes relatively longer to process than text.

The multiple portions are sent to multiple nodes (block 406). This step can be performed in any suitable way. For example, the service manager module 110 can transmit each of the multiple portions to a separate node in a pool of nodes 304. Each node 114 in the pool of nodes 304 is configured to process one or more of the portions.

The progress of processing the data file is monitored (block 408). This step can be performed and any suitable way. After sending the multiple portions of the data file to the nodes, the service manager module 110 can monitor results received from the nodes for corresponding portions.

An aggregation of the results received from the nodes can provide an indication of an amount of the data file that has been completed. The progress of the processing of the data file is compared to a predefined threshold (block 410). Any suitable threshold may be used. For example, a threshold may comprise a certain percentage or fraction of the data file that has been completed, such as 80% complete, three-fourths complete, and so on.

Based on the threshold being exceeded, at least one previously submitted portion can be dynamically split into sub-portions (block 412). Continuing with the above example, once the data file has reached 80% complete, the remaining 20%, which may include one or more of the previously split portions, can be further split into smaller sub-portions. The sub-portions are then submitted to one or more of the multiple nodes (block 414). In embodiments, the sub-portions may be submitted to nodes in the pool of nodes which are not currently processing another job. These nodes may include one or more nodes which have completed processing of previously submitted portions, or other nodes in the pool of nodes.

Depending on which results are received first, the overall processing time of the data file may be reduced. For example, if a result corresponding to the sub-portions is received (block 416) prior to a response corresponding to the previously submitted portion, then the result corresponding to the sub-portions is used to complete the processing of the data file (block 418). Otherwise, if the response corresponding to the previously submitted portion is received (block 420) prior to receiving the result corresponding to the sub-portions, then the response corresponding to the previously submitted portion is used to complete the processing of the data file (block 422).

Figure 5:
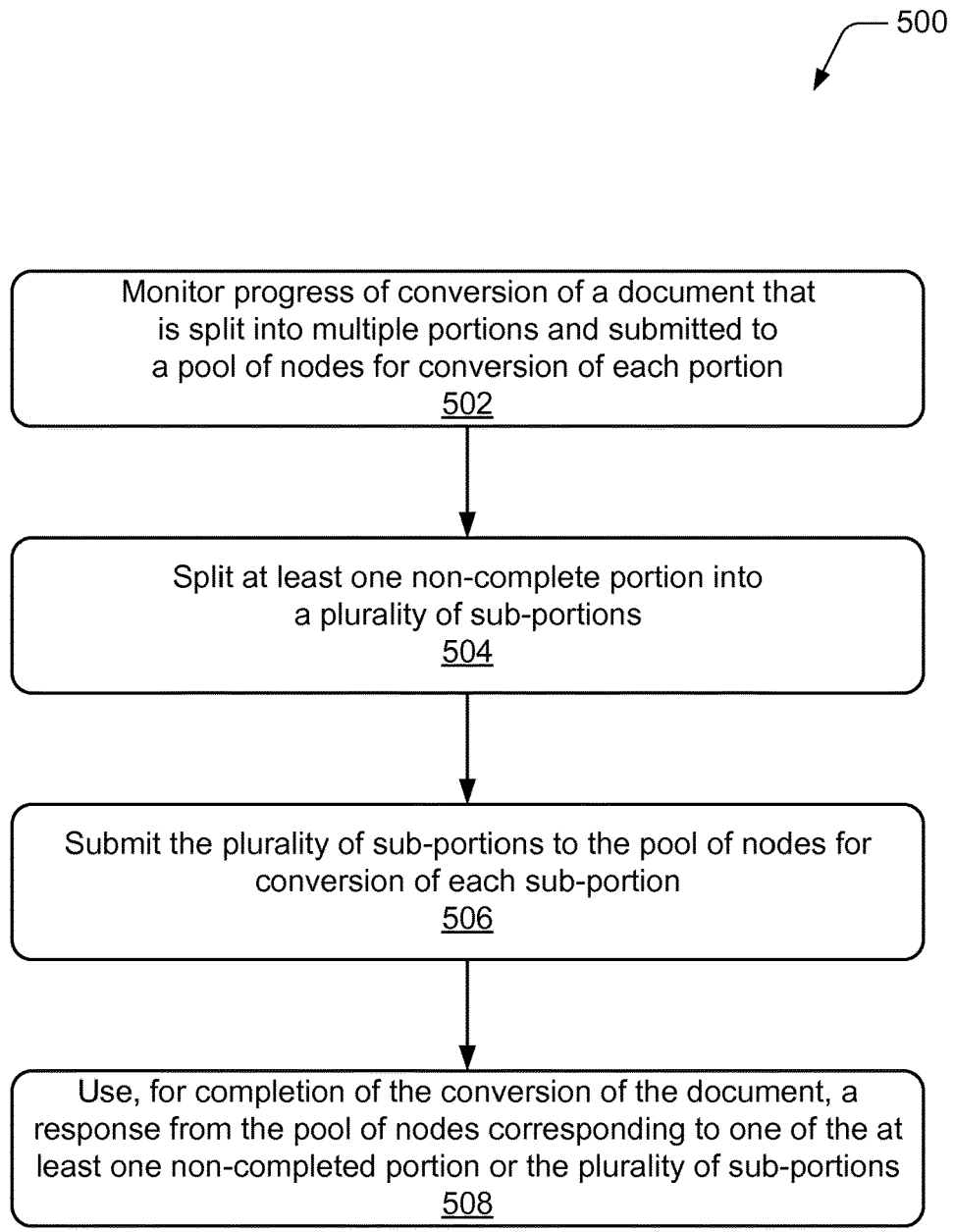
FIG. 5 is a flow diagram depicting a procedure in an example implementation in which adaptive parallel data processing techniques are employed.

Having discussed a general procedure with respect to FIG. 4, consider now a discussion of FIG. 5, which a flow diagram depicting a procedure 500 in an example implementation of adaptive parallel data processing techniques in greater detail. Progress of conversion of a document that is split into multiple portions and submitted to a pool of nodes for conversion of each portion is monitored (block 502). For example, the document can include an electronic document in a first format that is being converted into a second format. By way of example and not limitation, the conversion can include converting a "pdf" document into a searchable and/or editable form, such as a Word™ document or Excel™ document. In one or more embodiments, the conversion can include optical character recognition (OCR) of a document containing primarily image data. For example, text can be extracted from an image using OCR. The progress of the conversion may be monitored by receiving an indication of an amount of the conversion that is completed. The indication can include a percentage, a fraction, or other indicator of the document conversion process that is completed based on results received from the pool of nodes.

At least one non-completed portion is split into a plurality of sub-portions (block 504). This step can be performed in any suitable way. For example, the non-completed portion can be split in a manner similar to the splitting of the original document. The non-completed portion can be split into a number of sub-portions based on a number of nodes in the pool of nodes that are available to convert the sub-portions, or that are not currently processing another conversion job. Additionally, a threshold can be used to determine when to split the non-completed portion, such as for example 70% of total conversion of the document.

The plurality of sub-portions are then submitted to the pool of nodes for conversion of each sub-portion (block 506). Each sub-portion can be sent to a separate node in the pool of nodes. Because each sub-portion is relatively smaller than the corresponding non-completed portion, the sub-portions are likely to have relatively shorter individual processing times than that of the non-completed portion.

To complete the conversion of the document, a response from the pool of nodes is used that corresponds to either the non-completed portion or the plurality of sub-portions (block 508). For example, if a response corresponding to the non-completed portion is received first, then that response is used to complete the conversion of the document. On the other hand, if a response corresponding to the plurality of sub-portions is received first, then the response corresponding to the plurality of sub-portions is used to complete the conversion of the document.

Example System and Device

Figure 6:
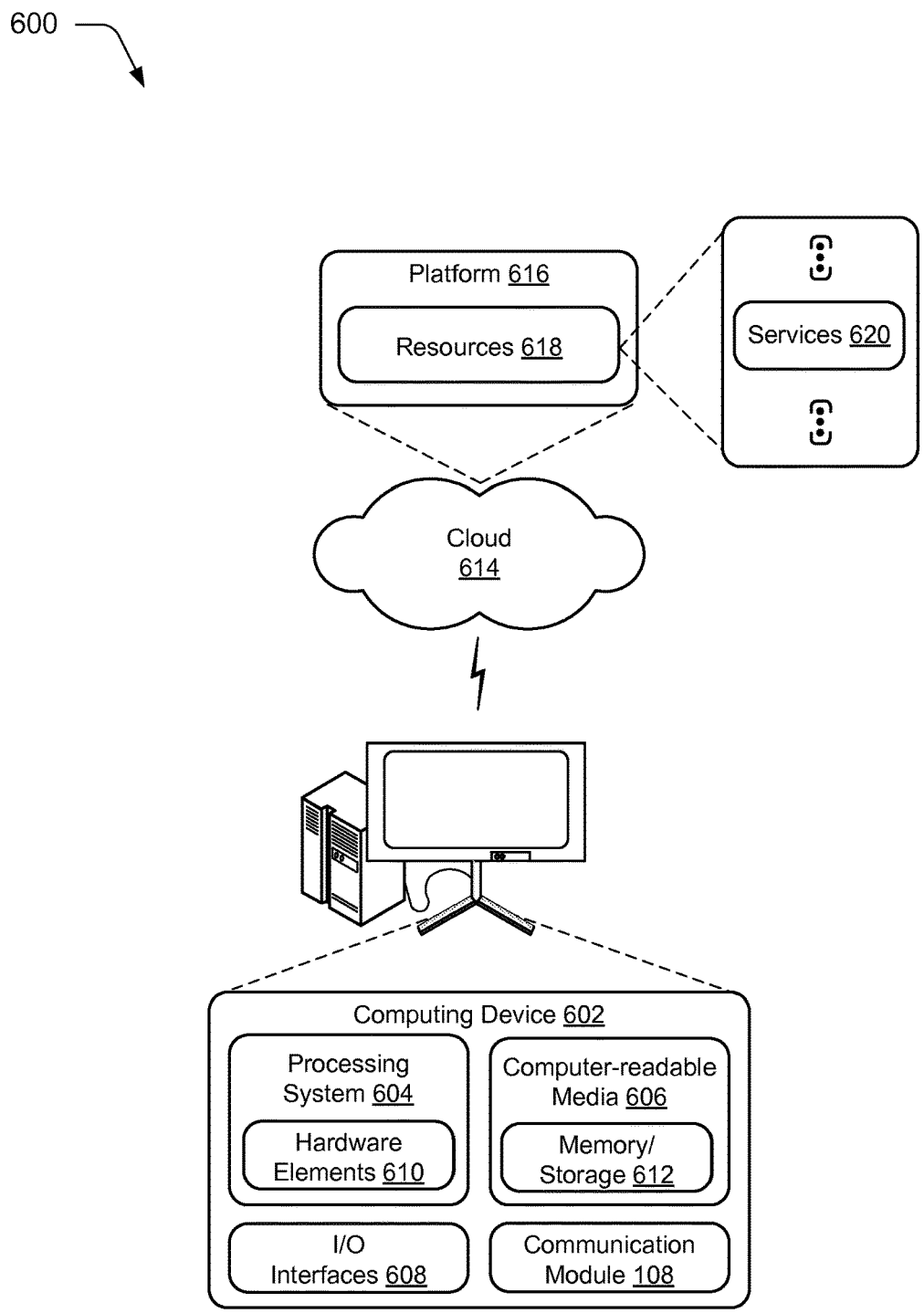
FIG. 6 illustrates various components of an example device that can be implemented as any type of computing device as described with reference to FIGS. 1-3 to implement embodiments of the techniques described herein.

FIG. 6 illustrates an example system generally at 600 that includes an example computing device 602 that is representative of one or more computing systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services 620 provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
receiving, at a server of a service provider, a request to convert an electronic data file from a first format to a second format, the first format including non-searchable text, the second format including computer-searchable text;
splitting, by the server of the service provider, the electronic data file into multiple portions;
transmitting, by the server of the service provider via a network, the multiple portions to multiple processing instances on a platform, each processing instance configured to process a respective portion of the electronic data file via the platform;
processing, by the server of the service provider, a proportion of the electronic data file in comparison to a predefined proportion threshold of the respective portions, the predefined proportion threshold defining a fraction of the electronic data file that has been completed that is less than an entirety of the electronic data file;
identifying, by the server of the service provider and responsive to an indication that the predefined proportion threshold is met or exceeded, at least one unfinished processing instance that has not completed processing of a portion previously transmitted to the unfinished processing instance;
splitting, by the server of the service provider and responsive to the indication that the predefined proportion threshold is met or exceeded, content of the portion previously transmitted to the unfinished processing instance into multiple sub-portions while continuing the processing of the portion previously transmitted to the unfinished processing instance by the unfinished processing instance;
transmitting, by the server of the service provider and via the network, the multiple sub-portions to one or more of the multiple processing instances available for processing the multiple sub-portions while the portion previously transmitted to the unfinished processing instance continues to be processed by the unfinished processing instance, the unfinished processing instance being unavailable for processing any other portion or sub-portion;
receiving, by the server of the service provider, a first completion response corresponding to either one of the multiple sub-portions or the previously transmitted portion; and
responsive to receiving the first completion response, using the first completion response as part of a result of converting the electronic data file to the second format.

2. A method as described in claim 1, further comprising receiving the electronic data file from a client device over a network.

3. A method as described in claim 1, further comprising:
monitoring progress of the processing of the electronic data file; and
comparing the progress of the processing to the predefined proportion threshold.

4. A method as described in claim 1, wherein the first completion response corresponds to the previously transmitted portion, a second completion response corresponds to the one of the multiple sub-portions, and the first completion response is received prior to receiving the second completion response.

5. A method as described in claim 1, wherein the first completion response corresponds to the one of the multiple sub-portions, a second completion response corresponds to the previously transmitted portion, and the first completion response is received prior to receiving the second completion response.

6. A method as described in claim 1, wherein the first format is non-editable and the second format is editable.

7. A method as described in claim 1, wherein the multiple processing instances include parallel computing engines in a cloud computing infrastructure.

8. A method as described in claim 1, wherein the electronic data file comprises a digital document having a plurality of pages, wherein each of the multiple portions comprises one or more of the plurality of pages.

9. A system comprising:
a memory and a processor configured to execute instructions in the memory to cause the processor to:
monitor, by a service manager module, progress of conversion of an electronic document from a first format to a second format, the first format including non-searchable text, the second format including computer-searchable text, the electronic document split into multiple portions and submitted to a pool of processing instances of a platform for conversion of respective portions;
process, by the pool of processing instances of the platform, a proportion of the electronic document in comparison to a predefined proportion threshold of the respective portions, the predefined proportion threshold defining a fraction of the electronic document that has been completed where the defined fraction is less than an entirety of the electronic data file;
responsive to completion of conversion of the predefined proportion of the electronic document:
identify, by the service manager module, at least one unfinished processing instance that has not completed processing of a portion previously submitted to the unfinished processing instance;
split, by the service manager module, content of the portion previously submitted to the unfinished processing instance into a plurality of sub-portions while the portion previously submitted to the unfinished processing instance continues to be processed by the unfinished processing instance, the unfinished processing instance being unavailable for processing any other portion or sub-portion; and
transmit, via a network, the plurality of sub-portions to the pool of processing instances for conversion of each sub-portion while the portion previously submitted to the unfinished processing instance continues to be processed by the unfinished processing instance;
receive, via the network, a first completion response corresponding to either the plurality of sub-portions or the at least one previously submitted portion; and
use, by the service manager module, the first completion response as part of a result of the conversion of the electronic document into the second format.

10. A system as described in claim 9, wherein the pool of processing instances comprises a plurality of parallel computing systems in a cloud computing infrastructure.

11. A system as described in claim 9, wherein the first format is non-editable and the second format is editable.

12. A system as described in claim 9, wherein the first completion response corresponds to the plurality of sub-portions, a second completion response corresponds to the at least one previously submitted portion, and the first completion response is received prior to receiving the second completion response.

13. One or more computer-readable storage media having instructions that, responsive to execution by a computer, cause the computer to perform operations comprising:
   monitoring, by a service manager module, progress of processing of an electronic file that is split into a plurality of portions to be processed by a plurality of processing instances on a platform, each one processing instance of the plurality of processing instances being configured to receive and process a respective portion of the plurality of portions, the processing including converting the electronic file from a first format to a second format, the first format including non-searchable text, the second format including computer-searchable text;
   receiving, by the service manager module, results corresponding to one or more of the plurality of portions;
   determining, by the service manager module, that a proportion of the processing of the electronic file has been completed based on an aggregation of the received results;
   based on a comparison of the aggregation of the received results to a predefined proportion threshold, identifying, by the service manager module, at least one unfinished processing instance that has not completed processing of a portion previously received by the unfinished processing instance, the predefined proportion threshold defining a fraction of the electronic file that has been completed that is less than an entirety of the electronic file;
   splitting, by the service manager module and responsive to the comparison of the aggregation of the received results to the predefined threshold, content of the portion previously received by the unfinished processing instance into a plurality of sub-portions while the portion previously received by the unfinished processing instance continues to be processed by the unfinished processing instance;
   communicating, via a network, the plurality of sub-portions to the plurality of processing instances for processing while the portion previously received by the unfinished processing instance continues to be processed by the unfinished processing instance, but the plurality of sub-portions not communicated to the unfinished processing instance;
   receiving, by the service manager module, a first completion response corresponding to either one of the plurality of sub-portions or the portion previously received; and
   converting, by the service manager module, the electronic file into the second format by using the first completion response as part of a result of the processing of the electronic file.

14. One or more computer-readable storage media as described in claim 13, wherein the plurality of processing instances include parallel computing instances operating in a cloud infrastructure.

15. One or more computer-readable storage media as described in claim 13, wherein the first format is non-editable and the second format is editable.

16. One or more computer-readable storage media as described in claim 13, wherein the operations further comprise receiving the electronic file from a client device over a network.

17. One or more computer-readable storage media as described in claim 13, wherein the plurality of portions have different processing times based on a type of content included in each portion.

18. One or more computer-readable storage media as described in claim 13, wherein communicating the plurality of sub-portions to the plurality of processing instances includes communicating the plurality of sub-portions to processing instances that are not currently processing a job.

19. One or more computer-readable storage media as described in claim 13, wherein each portion of the plurality of portions is sent to a separate processing instance on the platform.

20. One or more computer-readable storage media as described in claim 13, wherein individual processing times of each portion of the plurality of portions are heterogeneous.

* * * * *